J. C. BRIGGS.
Regulating Pendulum.
No. 15,356.
Patented July 15, 1856.
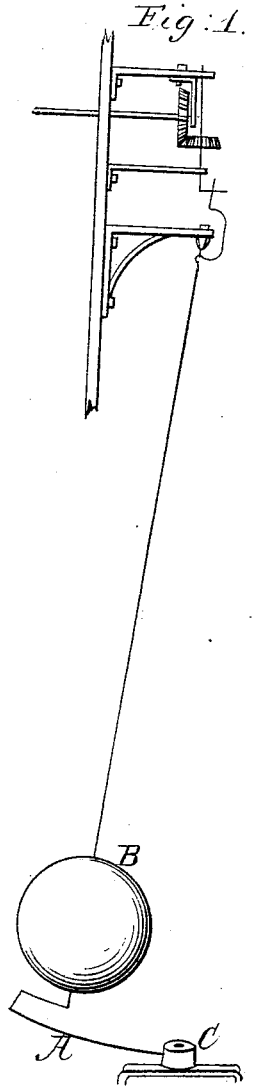
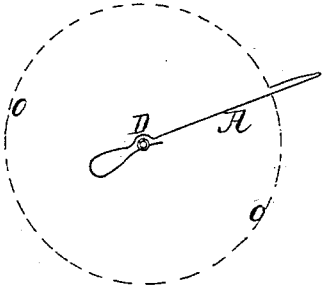
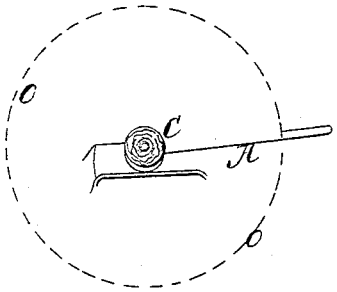

UNITED STATES PATENT OFFICE.

JNO. C. BRIGGS, OF CONCORD, NEW HAMPSHIRE.

MODE OF REGULATING THE CONICAL PENDULUM FOR TIMEKEEPERS.

Specification of Letters Patent No. 15,356, dated July 15, 1856.

*To all whom it may concern:*

Be it known that I, JOHN C. BRIGGS, of Concord, in the county of Merrimack and State of New Hampshire, have invented a new and Improved Mode of Regulating Rotary or Conical Pendulums; and I do hereby declare that the following is a full and exact description thereof, reference being had to the accompanying drawings and to the letters of reference marked thereon.

The object of this invention is to keep the pendulum describing, as nearly as possible, a circle of a uniform diameter.

The nature of it consists in applying more propelling power than is necessary to keep the pendulum moving in the desired circle, and then applying friction to counteract the excess of the propelling power and prevent the pendulum from taking a circle larger than the one desired.

A convenient mode of applying this friction is as represented by Figure 1. The pendulum (B) may be propelled by any known method; the propelling power being sufficient to propel the pendulum in a circle larger than the one desired. The friction is applied by an arm (A) revolving around the center of the revolution of the pendulum, so shaped, that when the pendulum describes the desired circle, it does not touch the arm (A); but as soon as the pendulum begins to go in a larger circle, it comes in contact with the arm (A) and carries the arm with it; and the power necessary to carry the arm (A,) so counteracts the propelling power of the pendulum, that it soon takes a smaller circle again and lets go the arm. The effect of this is that the pendulum continues to revolve close to the point of contact with the arm, repeatedly carrying the arm with it and, as often, letting the arm go. Thus compelling the pendulum to revolve in circles of nearly the same diameter, and so operating that any variations in them can be so arranged as to make a perfect regulator.

The arm (A), when the pendulum is not in contact with it, remains at rest. The friction of this arm is created by a heavy mass of metal (C,) to which the arm is attached, (Fig. 3 is a bird's-eye view of this O, O, being the circle described by the pendulum) or it may be created by a spring as represented by Fig. 2, or in any other convenient way. This arm should be made so as not to restrict the free play of the pendulum in its outward movement except so far as it counteracts or impedes the propelling power, i. e., should only come in contact with the pendulum in the line of its circuit and should not restrict it in its motion to or from the center.

For application to circulating pendulums having the maintaining power applied at the top, as Foucault's, the above description and drawings represent the full device, the heavy mass of metal C being kept in place by a stationary pin, in the center, around which it revolves. For application to other varieties of circulating pendulums the device remains essentially the same.

Where the maintaining power is applied at the bottom of the pendulum, as in the method previously patented by me, the arbor of the fastest pinion of the clock would come up through the center of the friction weight C, in place of the pin, or, through the center of the pin itself, and the driving arm would be upon the top of the arbor entirely above the friction arm, leaving the friction device the same as before.

The application of my invention being so similar in all cases I deem it unnecessary to describe particularly its application to other kinds of circulating pendulums.

What I claim as my invention and desire to secure by Letters Patent, is—

The application of friction to conical or rotary pendulums to keep them revolving, very nearly, in any desired circle, substantially in the manner and for the purposes described above.

JOHN C. BRIGGS.

Witnesses:
N. G. CARR,
B. P. WHIPPLE.